(12) United States Patent
Nakamura et al.

(10) Patent No.: US 10,685,211 B2
(45) Date of Patent: Jun. 16, 2020

(54) HEAD-MOUNTED DISPLAY, DISPLAY CONTROL METHOD, AND PROGRAM

(71) Applicant: SONY INTERACTIVE ENTERTAINMENT INC., Tokyo (JP)

(72) Inventors: Yuichiro Nakamura, San Mateo, CA (US); Yasushi Okumura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 47 days.

(21) Appl. No.: 15/744,341

(22) PCT Filed: Aug. 2, 2016

(86) PCT No.: PCT/JP2016/072678
§ 371 (c)(1),
(2) Date: Jan. 12, 2018

(87) PCT Pub. No.: WO2017/022769
PCT Pub. Date: Feb. 9, 2017

(65) Prior Publication Data
US 2018/0204050 A1    Jul. 19, 2018

(30) Foreign Application Priority Data

Aug. 4, 2015   (JP) .................................. 2015-153920

(51) Int. Cl.
*G06K 9/00* (2006.01)
*G02B 27/01* (2006.01)
(Continued)

(52) U.S. Cl.
CPC ....... *G06K 9/00201* (2013.01); *G02B 27/017* (2013.01); *G02B 27/0172* (2013.01);
(Continued)

(58) Field of Classification Search
CPC ............ G06K 9/00201; G06K 9/00671; G06F 3/011; G06T 19/006
See application file for complete search history.

(56) References Cited

U.S. PATENT DOCUMENTS 9,310,884 B2 *   4/2016   Benson ................ G02B 27/017
9,857,588 B2 *   1/2018   Kobayashi ........... G02B 27/017
(Continued)

FOREIGN PATENT DOCUMENTS

EP          2660643 A2      11/2013
EP          3215917 A1       9/2017
(Continued)

OTHER PUBLICATIONS

Supplementary Search Report dated Mar. 6, 2019, from the corresponding EP Patent Application No. 16833048.
(Continued)

*Primary Examiner* — Feng Niu
(74) *Attorney, Agent, or Firm* — Katten Muchin Rosenman LLP

(57) ABSTRACT

A head-mounted display, a display control method, and a program that facilitate a user to understand proximity between the user and an object around the user are provided. A display block (36) is arranged in front of the eyes of the user wearing a HMD (12). In accordance with proximity between the user and an object around the user, the HMD (12) controls the display block (36) so as to have the user visually recognize a forward direction of the display block (36).

4 Claims, 4 Drawing Sheets

(51) Int. Cl.
*G06T 7/285* (2017.01)
*G06F 3/01* (2006.01)

(52) U.S. Cl.
CPC .............. *G06F 3/011* (2013.01); *G06T 7/285* (2017.01); *G02B 2027/014* (2013.01); *G02B 2027/0127* (2013.01); *G02B 2027/0138* (2013.01); *G02B 2027/0167* (2013.01)

(56) References Cited

U.S. PATENT DOCUMENTS

| | | | |
|---|---|---|---|
| 10,133,364 B2* | 11/2018 | Shimoda | G06F 3/011 |
| 2011/0234619 A1 | 9/2011 | Tokunaga | |
| 2013/0293688 A1* | 11/2013 | Benson | G02B 27/017 |
| | | | 348/53 |
| 2013/0326364 A1* | 12/2013 | Latta | G06F 3/012 |
| | | | 715/751 |
| 2013/0328928 A1 | 12/2013 | Yamagishi et al. | |
| 2013/0335301 A1* | 12/2013 | Wong | G02B 27/0093 |
| | | | 345/8 |
| 2014/0364212 A1 | 12/2014 | Osman et al. | |
| 2015/0371444 A1* | 12/2015 | Hara | G02B 27/017 |
| | | | 345/633 |
| 2016/0054565 A1 | 2/2016 | Izumihara et al. | |
| 2016/0070343 A1* | 3/2016 | Li | G02B 27/0172 |
| | | | 345/633 |
| 2018/0204050 A1* | 7/2018 | Nakamura | G06T 7/285 |

FOREIGN PATENT DOCUMENTS

| | | |
|---|---|---|
| JP | 2004-205711 A | 7/2004 |
| JP | 2010-145436 A | 7/2010 |
| JP | 2012-002889 A | 1/2012 |
| JP | 2013-210588 A | 10/2013 |
| JP | 2013257716 A | 12/2013 |
| JP | 2015-64868 | 4/2015 |
| JP | 2015191124 A | 11/2015 |
| JP | 5869712 B1 | 2/2016 |
| WO | 2013052855 A2 | 4/2013 |
| WO | 2014/156389 A1 | 10/2014 |
| WO | 2016073783 A1 | 5/2016 |
| WO | 2016163183 A1 | 10/2016 |

OTHER PUBLICATIONS

International Preliminary Report on Patentability dated Feb. 15, 2018, from the corresponding PCT/JP2016/072678.
International Search Report and Written Opinion dated Oct. 4, 2016, from the corresponding PCT/JP2016/072678.

* cited by examiner

HEAD-MOUNTED DISPLAY, DISPLAY CONTROL METHOD, AND PROGRAM

TECHNICAL FIELD

The present invention relates to a head-mounted display, a display control method, and a program.

BACKGROUND ART

Head-mounted displays (HMDs) are known that are worn on the head of user for viewing video images and the like as described in PTL 1 through 3 below, for example.

Some of these HMDs have a mechanism for controlling whether or not for a user to visually recognize a forward view beyond a display block arranged in front of the eyes of the user. For example, some of HMDs of video see-through type with a camera mounted allow a user to visually recognize a forward view beyond a display block by displaying a video image obtained by taking the ahead of the display. Further, in the case of an HMD of optical see-through type having a display block of optical transparency, for example, a user is able to visually recognize a forward view beyond the display block by turning off a displayed video image. On the other hand, in the case where such video images of content as a video image, for example, representing a game play situation and a video image of a movie are displayed, a user cannot sometimes visually recognize a forward view beyond the display block.

CITATION LIST

Patent Literature

[PTL 1]
JP 2004-205711A
[PTL 2]
JP 2012-2889A
[PTL 3]
JP 2013-210588A

SUMMARY

Technical Problems

With related-art HMDs, a user is required to manually select through a switch, for example, between a situation allowing the user to visually recognize a forward view beyond the display block and a situation disallowing the user to visually recognize a forward view beyond the display block.

Hence, there actually occurs a situation in which a user wearing an HMD can hardly know proximity between the user and an object around the user when the user cannot visually recognize a forward view beyond the display block of the HMD.

Therefore, the present invention addresses the actual situation above and one of the objects of the present invention is to provide a head-mounted display, a display control method, and a program which allow a user to easily know that the user is approaching toward peripheral objects.

Solutions to Problems

In order to solve the problems above, a head-mounted display according to the present invention is worn by a user. This head-mounted display includes a display block arranged in front of the eyes of the user and a control block configured to have the user visually recognize a forward direction of the display block by controlling the display block in accordance with proximity between the user and an object around the user.

In one aspect of the present invention, the head-mounted display further includes a camera configured to take an image of a forward direction of the display block. The control block may execute control such that a video image taken by the camera is displayed on the display block in accordance with proximity between the user and an object around the user.

In the aspect, the camera may be a stereo camera. The head-mounted display may further include a detection block configured to detect proximity between the user and the object on the basis of an image taken by the stereo camera. The control block may execute control such that a video image taken by the camera is displayed on the display block in accordance with proximity detected by the detection block.

In the aspect, the detection block may detect proximity between the user and the object on the basis of a distance between the user and the object that is identified on the basis of an image taken by the stereo camera.

Further, the head-mounted display further may include a detection block configured to detect proximity between the user and the object on the basis of an image taken by a camera separate from the camera included in the head-mounted display. The control block may execute control such that a video image taken by the camera is displayed on the display block in accordance with proximity detected by the detection block.

Further, in one aspect of the present invention, the display block may have optical transmissivity. The control block may suppress displaying of a video image by the display block in accordance with proximity between the user and an object around the user.

Also, a display control method according to the present invention includes the step of: having a user wearing a head-mounted display visually recognize a forward direction of a display block arranged in front of the eyes of the user in accordance with proximity between the user and an object around the user.

Also, a program according to the present invention for having a computer execute the procedure of: having a user wearing a head-mounted display visually recognize a forward direction of a display block arranged in front of the eyes of the user in accordance with proximity between the user and an object around the user.

DESCRIPTION OF EMBODIMENT

The following describes one embodiment of the present invention with reference to drawings.

Figure 1:
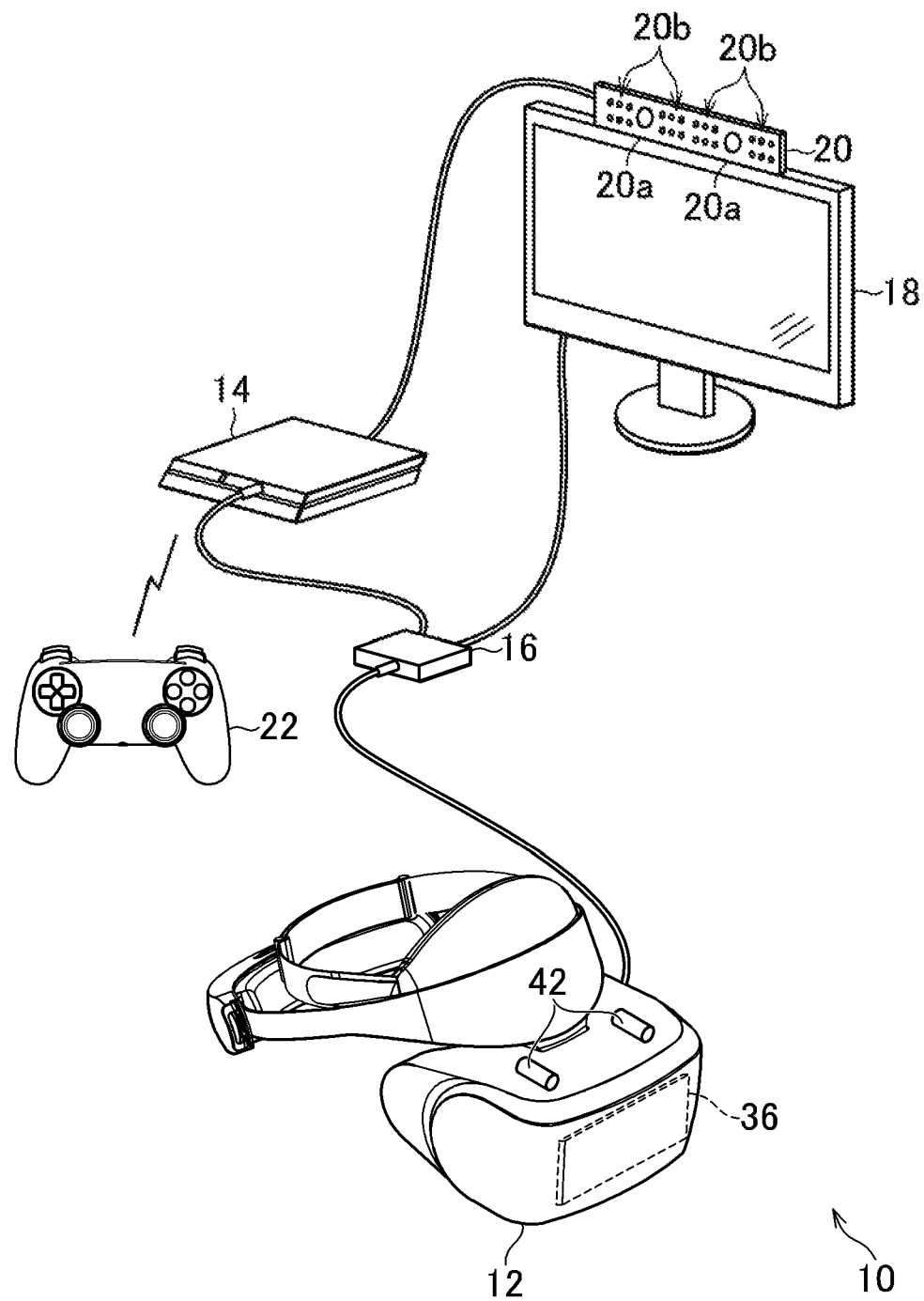
FIG. 1 is a diagram illustrating one example of an overall configuration of a video display system related with one embodiment of the present invention.
Figure 2:
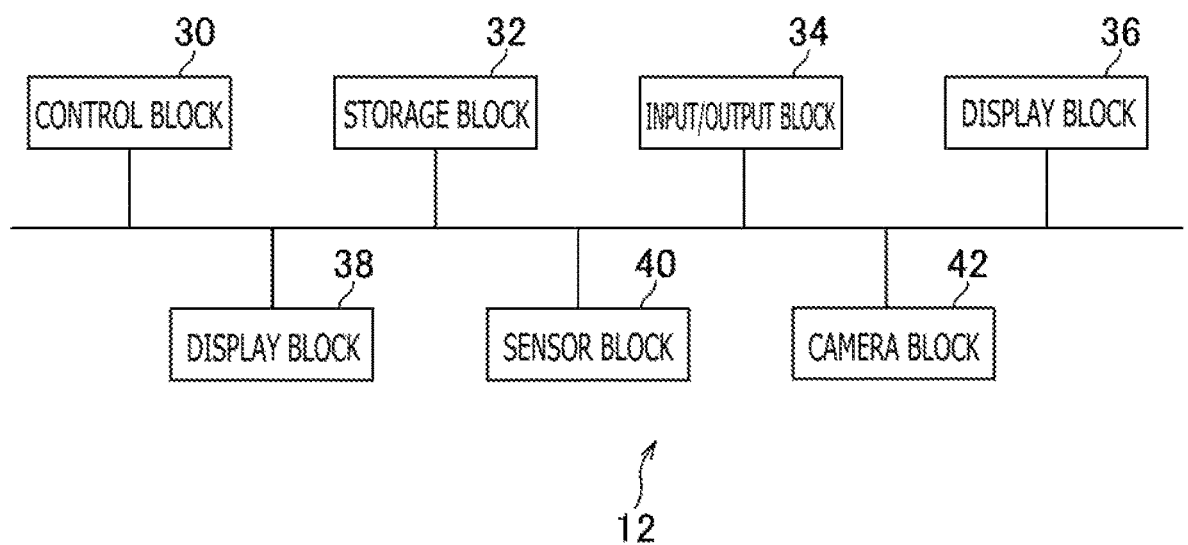
FIG. 2 is a diagram illustrating one example of a configuration of a head-mounted display related with one embodiment of the present invention.

Now, referring to FIG. 1, there is depicted a diagram illustrating one example of an overall configuration of a video display system 10 related with one embodiment of the present invention. FIG. 2 illustrates one example of a head-mounted display (HMD) 12 related with one embodiment of the present invention.

As depicted in FIG. 1, an information processing apparatus 10 related with the present embodiment includes the HMD 12, an entertainment apparatus 14, a relay apparatus 16, a display 18, a camera and microphone unit 20, and a controller 22.

The HMD 12 related with the present embodiment includes a control block 30, a storage block 32, an input/output block 34, a display block 36, an audio output block 38, a sensor block 40, and a camera block 42 as depicted in FIG. 2, for example.

The control block 30 is a program controlled device such as a microprocessor that operates under as instructed by programs installed in the HMD 12, for example.

The storage block 32 is a storage device such as read-only memory (ROM) and random access memory (RAM). The storage block 32 stores programs that are executed by the control block 30.

The input/output block 34 is an input/output port such as an HDMI (registered trademark) (High-Definition Multimedia Interface) port or a universal serial bus (USB) port.

The display block 36 is a display such as a liquid crystal display or an organic electroluminescence (EL) display that displays a video image generated by the entertainment apparatus 14 and a video image taken through the camera block 42. The display block 36 related with the present embodiment is configured to display a three-dimensional image by displaying an image for the left eye and an image for the right eye at the same time, for example. It should be noted that the display block 36 may be a display that is enabled to display only two-dimensional images rather than three-dimensional images.

The audio output block 38 is a speaker, for example, from which audio and the like represented by audio data generated are outputted by the entertainment apparatus 14.

The sensor block 40 is a sensor such as an acceleration sensor or a motion sensor, for example, and outputs measurement results of an attitude, a rotational amount, a travel amount, and so on of the HMD 12 to the control block 30 at a predetermined frame rate (an interval of 1/60 second, for example). Then, the control block 30 identifies a travel amount and a rotational amount of the HMD 12 per unit time, namely, a speed and an angular velocity of the HMD 12 on the basis of these measurement results. Thus, in the present embodiment, a travel amount and a rotational amount of the HMD 12 can be identified at a predetermined frame rate. Further, the sensor block 40 may include a sensor such as an infrared ray sensor that is capable of detecting the attachment and detachment of the HMD 12 by the user, for example.

The camera block 42 is a digital camera, for example that takes images of states around the user wearing the HMD 12 at a predetermined frame rate. As depicted in FIG. 1, the camera block 42 related with the present embodiment is mounted in two units on top of the display block 36 so as to be capable of imaging the forward direction of the display block 36. In addition, the camera block 42 related with the present embodiment is a stereo camera including a lens for taking an image for the left eye and a lens for generating an image for the right eye, for example. Then, on the basis of an image to be taken, the camera block 42 related with the present embodiment is configured to identify a distance between the user and an object around the user, for example. It should be noted that, in the present embodiment, a distance between the camera block 42 and an object existing around the user is handled as a distance between the user and the object concerned.

The entertainment apparatus 14 related with the present embodiment is a computer such as a game console, a digital versatile disc (DVD) player, a Blu-ray (registered trademark) player, or the like, for example. The entertainment apparatus 14 related with the present embodiment outputs a video signal representative of a video signal generated by the execution of a stored game program or the reproduction of content recorded on an optical disc, for example, to the HMD 12 and the display 18 via the relay apparatus 16.

The display 18 related with the present embodiment is a liquid crystal display or the like, for example that displays a video signal representative of a video signal outputted from the entertainment apparatus 14.

The camera and microphone unit 20 related with the present embodiment includes a camera 20a that outputs images of a taken subject to the entertainment apparatus 14 and a microphone 20b that picks up surround sound, converts the sound into audio data, and outputs the audio data to the entertainment apparatus 14. The camera 20a related with the present embodiment is a stereo camera.

The HMD 12 and the relay apparatus 16 are interconnected with an HDMI cable or a USB cable, for example. The entertainment apparatus 14 and the relay apparatus 16 are interconnected with an HDMI cable or a USB cable, for example. The relay apparatus 16 and the display 18 are interconnected with an HDMI cable or the like, for example. The entertainment apparatus 14 and the camera and microphone unit 20 are interconnected with an auxiliary (AUX) cable or the like, for example.

The controller 22 related with the present embodiment is an manipulation input apparatus through which manipulative operations by the user are entered into the entertainment apparatus 14. By pressing a direction key or a button or tilting a manipulation stick arranged on the controller 22, the user is able to execute various kinds of manipulation inputs through the controller 22. In the present embodiment, the controller 22 outputs input data corresponding to manipulation inputs to the entertainment apparatus 14. In addition, the controller 22 related with the present embodiment includes a USB port. Being connected to the entertainment apparatus 14 with a USB cable, the controller 22 can output the input data to the entertainment apparatus 14 in a wired manner. Further, the controller 22 related with the present embodiment includes a wireless communication module or the like so as to output the input data to the entertainment apparatus 14 in a wireless manner.

Figure 3:
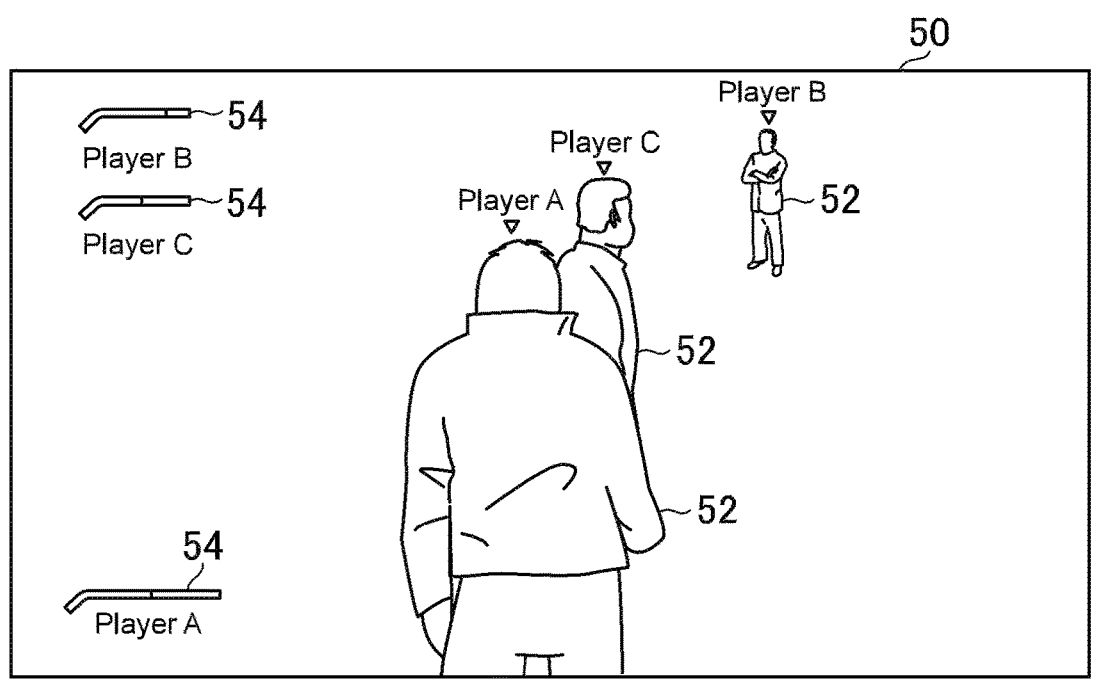
FIG. 3 is a diagram illustrating one example of a play image.

FIG. 3 is a diagram illustrating one example of a play image 50 displayed on the display block 36 of the HMD 12 when the user of the HMD 12 is playing a game. The play image 50 depicted in FIG. 3 is a frame image for the left eye or a frame image for the right eye that makes up a video image generated by the entertainment apparatus 14 executing a game program, for example, and outputted to the HMD 12. The play image 50 depicted in FIG. 3 is indicative of a state in which a sight-of-line direction is seen from a viewpoint inside a virtual space arranged with character objects 52 corresponding to three players (a player A, a player B, and a player C in this case), for example. In the play image 50 depicted in FIG. 3, a power gage 54 of each player is also arranged.

Then, the present embodiment is configured such that, by manipulating the controller 22, the user wearing the HMD 12 can execute various manipulation inputs in a game being played. In addition, by moving or rotating the head, the user wearing the HMD 12 can execute various manipulation inputs in a game being played. For example, while the play image 50 depicted in FIG. 3 is displayed, moving the head of the user causes the viewpoint arranged inside a virtual space to move in the head moving direction. For example again, when the user rotates the head, the line-of-sight direction of the viewpoint arranged inside a virtual space rotates in the direction in which the head rotated.

Figure 4:
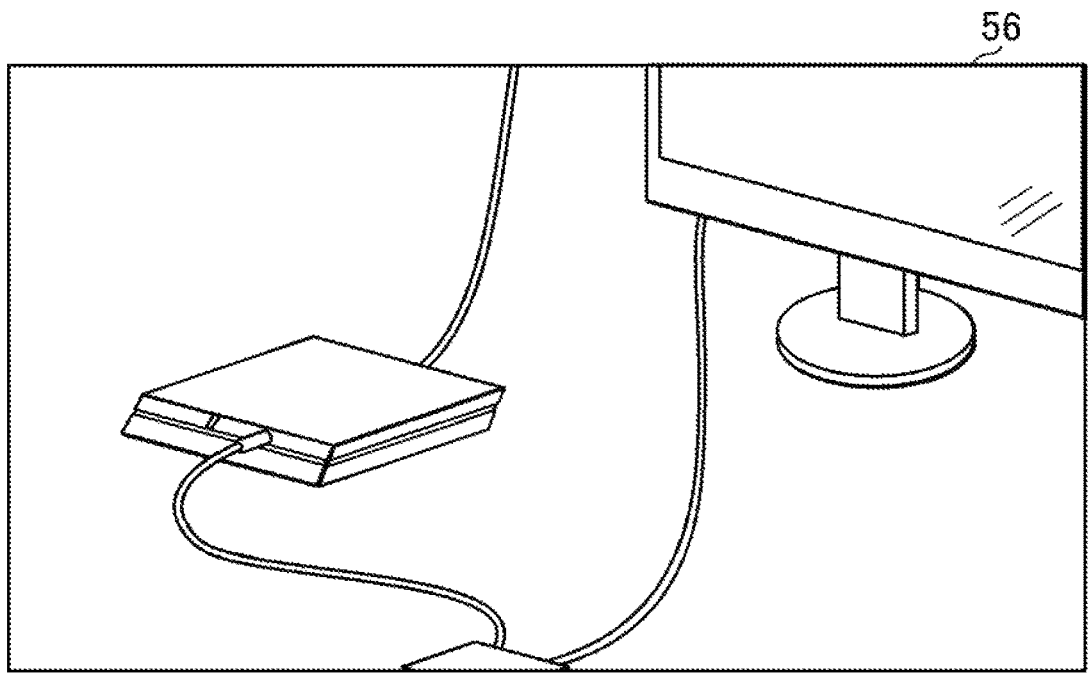
FIG. 4 is a diagram illustrating one example of a taken image.

Then, in the present embodiment, when the user approaches an object around this user, a video image displayed on the display block 36 of the HMD 12 is switched to a video image taken by the camera block 42. FIG. 4 is a diagram illustrating one example of a taken image 56 that is a frame image for the left eye or a frame image for the right eye making up a video image taken by the camera block 42. As depicted in FIG. 4, the taken image 56 includes the images of such objects arranged in front of the user wearing the HMD 12 as the entertainment apparatus 14, the display 18 and so on. Thus, according to the present embodiment, when the user approaches the above-mentioned object, a state in front of the display block 36 is displayed on the display block 36, thereby facilitating the user to understand the proximity between the user and the object.

The following further describes functions of the HMD 12 related with the present embodiment and processing to be executed by the HMD 12 related with the present embodiment.

Figure 5:
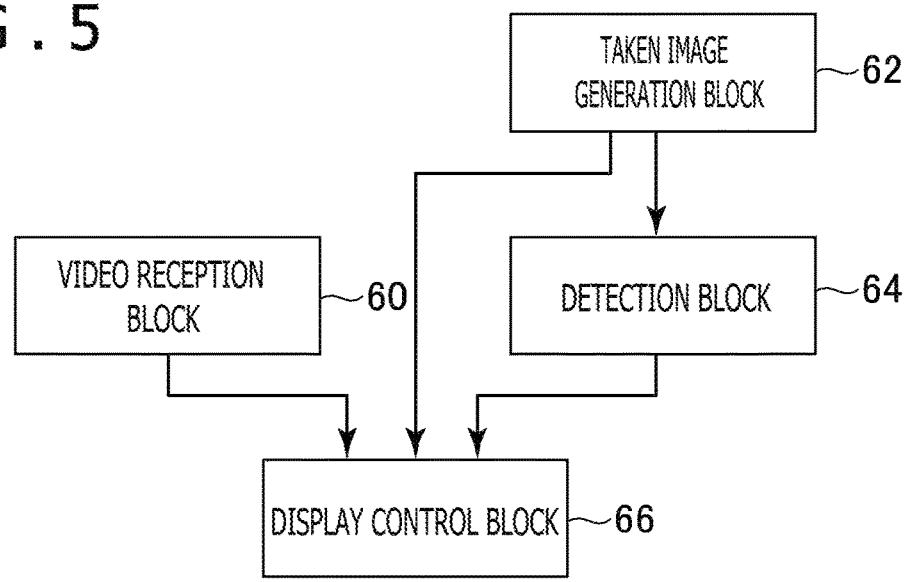
FIG. 5 is a functional block diagram illustrating one example of functions installed on the head-mounted display related with one embodiment of the present invention.

Referring to FIG. 5, there is depicted a functional block diagram illustrating one example of functions that are installed on the HMD 12 related with the present embodiment. Incidentally, in the HMD 12 related with the present embodiment, all of the functions depicted in FIG. 5 are not necessarily installed or it is also practicable to install functions other than those depicted in FIG. 5.

As depicted in FIG. 5, the HMD 12 related with the present embodiment functionally includes a video reception block 60, a taken image generation block 62, a detection block 64, and a display control block 66. The video reception block 60 is installed mainly on the input/output block 34. The taken image generation block 62 is installed mainly on the camera block 42. The detection block 64 is installed mainly on the control block 30 or the camera block 42. The display control block 66 is installed mainly on the control block 30 and the display block 36.

The functions mentioned above are installed by having the control block 30 execute programs including instructions corresponding to these functions, the control block 30 being installed on the HMD 12 that is a computer. These programs are supplied to the HMD 12 via a computer-readable information storage medium such as an optical disc, a magnetic disc, a magnetic tape, a magneto-optical disc, or a flash memory or via the Internet or the like.

In the present embodiment, the video reception block 60 receives a video image generated and outputted by the entertainment apparatus 14, for example. In the present embodiment, the entertainment apparatus 14 generates a video image by executing a stored program or reproducing content recorded on an optical disc, for example. Then, in the present embodiment, the entertainment apparatus 14 transmits a video signal representative of the generated video image to the relay apparatus 16, for example. Then, in the present embodiment, the relay apparatus 16 receives this video signal and transmits the received video signal to the HMD 12, for example. It should be noted that the relay apparatus 16 may transmit this video signal to the display 18. In addition, the relay apparatus 16 may convert the video signal received from the entertainment apparatus 14 into a predetermined format and transmit the converted video signal to the display 18. Next, the display 18 receives the video signal transmitted from the relay apparatus 16 and outputs a video image represented by the received video signal.

In the present embodiment, the taken image generation block 62 generates the taken image 56 at a predetermined frame rate, for example. In the present embodiment, as described above, an image for the left eye and an image for the right eye are generated at a predetermined frame rate.

In the present embodiment, the detection block 64 detects proximity between the user and an object around the user, for example. In the present embodiment, a distance up to an object with a character included in the taken image 56 is identified at the above-mentioned predetermined frame rate on the basis of an image for the left eye and an image for the right eye that are generated by the taken image generation block 62, for example. The detection block 64 related with the present embodiment is configured to identify, for pixels making up the taken image 56, a distribution of distances up to positions on the surface of an object represented by the pixels concerned, for example. Then, in the present embodiment, the detection block 64 identifies the shortest distance of the distances identified for the pixels as described above, for example. In what follows, the distance identified as described above is referred to as an object shortest distance. Then, in the present embodiment, on the basis of the identified object shortest distance, the detection block 64 identifies whether or not the user and an object around the user are in a state of close to each other.

In the present embodiment, the display control block 66 controls displaying of the display block 36 at the above-mentioned predetermined frame rate, for example. In the present embodiment, when proximity between the user and an object around the user is detected by the detection block 64, the display control block 66 executes control such that the taken image 56 is forcibly displayed on the display block 36, for example. Thus, in the present embodiment, the display control block 66 controls the display block 36 in accordance with proximity between the user and an object around the user, thereby having the user visually recognize the forward direction of the display block 36. On the other hand, in the present embodiment, if the user and an object around the user are found not in a proximity state by the detection block 64, then the display block 36 is controlled so as to display the play image 50.

Further, in the present embodiment, it is assumed whether a video image taken by the camera block 42 is in a forced state where this video image is forcibly displayed on the display block 36 or a video image taken by the camera block 42 is in a non-forcible state where this video image is not forcibly displayed on the display block 36 be managed by a forced state management flag. Then, in the present embodiment, it is assumed that the display control block 66 hold the forced state management flag. In the present embodiment, if the HMD 12 is in the above-mentioned forced state, then the value of the forced state management flag is "1." If the HMD 12 is in the above-mentioned non-forced state, then the value of the forced state management flag is "0."

Figure 6:
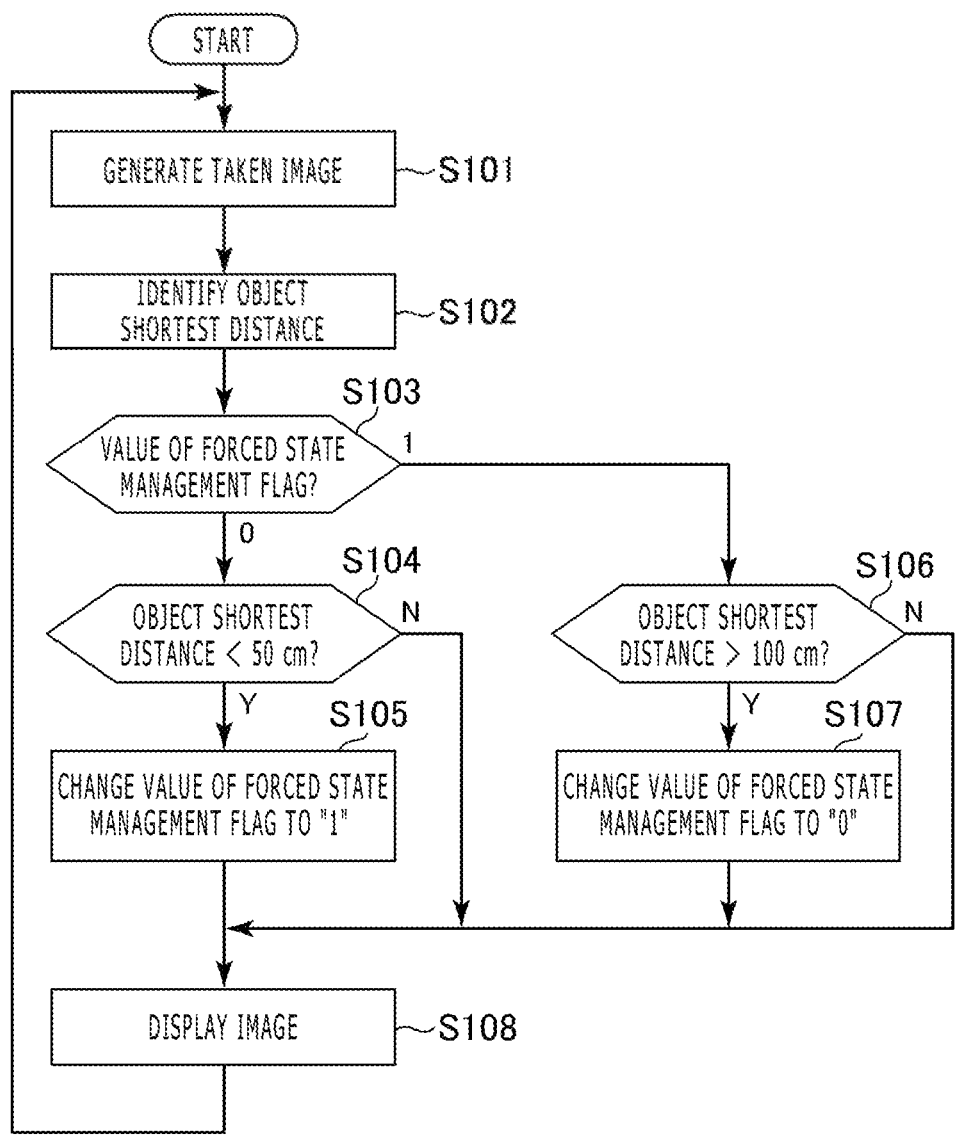
FIG. 6 is a diagram illustrating one example of a flow of processing to be executed in the head-mounted display related with one embodiment of the present invention.

The following describes one example of a flow of display control processing that is executed on the HMD 12 related with the present embodiment at a predetermined frame rate, with reference to a flow chart illustrated in FIG. 6.

First, the taken image generation block 62 generates the taken image 56 (S101). Next, on the basis of the taken image 56 generated by the processing depicted in S101, the detection block 64 identifies the above-mentioned object shortest distance (S102).

Then, the detection block 64 confirms the value of the forced state management flag held in the display control block 66 (S103). If the value of the forced state management flag is found to be "0," then the detection block 64 determines whether or not the object shortest distance identified by the processing depicted in S102 is shorter than a first threshold value (here, 50 cm, for example) (S104).

If the object shortest distance identified by the processing depicted in S102 is found to be higher than the first threshold value (S104: N), then the procedure goes to the processing depicted in S108. If the object shortest distance identified by the processing depicted in S102 is found to be lower than the first threshold value (S104: Y), then the display control block 66 changes the stored value of the forced state management flag to "1" (S105). Then the procedure goes to the processing depicted in S108.

If the value of the forced state management flag is found to be "1" by the processing depicted in S103, then the detection block 64 determines whether or not the object shortest distance identified by the processing depicted in S102 is longer than a second threshold value (here, 100 cm, for example) (S106).

If the object shortest distance identified by the processing depicted in S102 is found to be lower than the second threshold value (S106: N), then the procedure goes to the processing depicted in S108. If the object shortest distance identified by the processing depicted in S102 is found to be higher than the second threshold value (S106: Y), then the display control block 66 changes the stored value of the forced state management flag to "0" (S107). Then, the procedure goes to the processing depicted in S108.

Next, the display control block 66 executes control such that an image corresponding to the stored value of the forced state management flag is displayed on the display block 36 (S108). Here, if the value of the forced state management flag is found to be "1" for example, then the display control block 66 displays the taken image 56 generated by the processing depicted in S101. On the other hand, if the value of the forced state management flag is found to be "0," then the display control block 66 displays a frame image to be displayed in this frame.

In the present embodiment, as described above, the processing operations depicted in S101 through S108 are repetitively executed at a predetermined frame rate.

As described above, in the present processing example, the threshold value (the first threshold value) with which the HMD 12 is changed from the non-forced state to the forced state is lower than the threshold value (the second threshold value) with which the HMD 12 is changed from the forced state to the non-forced state. Hence, according to the present processing example, the occurrence of a situation in which a state in which the taken image 56 is displayed and a state in which the play image 50 is displayed are alternated at a short interval can be prevented.

Further, in the present embodiment, as described above, it is necessary for the detection block 64 to identify the above-mentioned object shortest distance at a predetermined frame rate, so that, even if the taken image 56 is not displayed on the display block 36, the taken image generation block 62 generates the taken image 56 at a predetermined frame rate. Thus, in the present embodiment, the taken image 56 to be displayed in accordance with the proximity between the user and an object in front of the user is also used for the detection of the proximity between the user and an object in front of the user. Hence, in the present embodiment, it is unnecessary to separately arrange a distance measuring apparatus such as an infrared sensor for the detection of the proximity between the user and an object in front of the user in the HMD 12. As a result, the number of parts and the production cost of the HMD 12 can be reduced in the present embodiment.

Obviously, the sensor block 40 may include a distance measuring apparatus for the detection of the proximity between the user and an object in front of the user. Then, on the basis of a distance between the user and an object around the user measured by that distance measuring apparatus, the detection block 64 may detect the proximity between the user and that object. In this case, if the taken image 56 is not displayed on the display block 36, the taken image generation block 62 may not generate the taken image 56.

Also, for example, the detection block 64 may detect that there is an object inside a movable range of the arms and legs of the user. If an object is found to be inside the movable range of the hands and legs of the user, the HMD 12 may be changed from the non-forced state to the forced state.

In addition, on the basis of an image taken by the camera 20a that is separate from the camera block 42, the detection block 64 may detect the proximity between the user and an object. Then, in accordance with the proximity detected on the basis of the image taken by the camera 20a, the display control block 66 may execute control such that a video image taken by the camera block 42 is displayed on the display block 36. For example, the camera and microphone unit 20 may transmit the images generated by the two lenses of the camera 20a that is a stereo camera to the HMD 12 via the relay apparatus 16. Then, on the basis of the two images taken in a same frame by the two lenses of the camera 20a, the detection block 64 of the HMD 12 may identify a distance between the HMD 12 and an object nearest to the HMD 12 as the object shortest distance. Here, the camera and microphone unit 20 may identify the object nearest distance and transmit the data indicative of the identified object shortest distance to the HMD 12 via the relay apparatus 16. Then, on the basis of the identified object shortest distance, the same processing as the above-mentioned processing operations S103 through S108 may be executed.

Further, even if the HMD 12 is in the non-forced state, the taken image 56 may be displayed on the display block 36 in accordance with a manipulation executed by the user, for example.

Still further, even if the HMD 12 is in the non-forced state, a part of the play image 50, only the power gage 54, for example, may be displayed on the taken image 56 in a superimposed manner. Yet further, even if the HMD 12 is in the non-forced state, the play image 50 may be displayed along with the taken image 56 in a reduced manner. This arrangement allows the user to visually recognize images generated by the entertainment apparatus 14, even if the HMD 12 is in the non-forced state.

The present invention is also applicable to the HMD 12 of optical see-through type with the display block 36 having optically transmissive property, in addition to the above-mentioned HMD 12 of video see-through type with the camera block 42 installed. For example, when the HMD 12 is changed from the non-forced state to the forced state, the display control block 66 of the HMD 12 of optical see-through type may suppress the displaying of a video image, thereby making the user visually recognize the forward direction of the display block 36. For example, when the HMD 12 is changed from the non-forced state to the forced state, a video image may be displayed in a dimmed manner or the displaying of a video image may be stopped.

It should be noted that a trigger with which the HMD 12 is changed from the non-forced state to the forced state and a trigger with which the HMD 12 is changed from the forced state to the non-forced state are not restricted to the detection of the proximity between the user and an object around this user.

For example, in accordance with the detection that the head of the user wearing the HMD 12 has moved down, the HMD 12 may be changed from the non-forced state to the forced state. Here, the detection that the head of the user wearing the HMD 12 has moved down can be done on the basis of the direction of the HMD 12 that is measurable by a sensor such as an acceleration sensor or a motion sensor included in the sensor block 40. To be more specific, when the sensor block 40 detects that the HMD 12 has tilted down more than 45 degrees relative to the horizontal direction, the HMD 12 may be changed from the non-forced state to the forced state.

Further, on the basis of the taken image 56 taken by the camera block 42 or a combination of the taken image 56 and a detection result of the sensor block 40, the moving down of the head of the user wearing the HMD 12 may be detected, for example. Still further, on the basis of an image taken by the camera 20a, the moving down of the head of the user wearing the HMD 12 may be detected. To be more specific, a region in which a floor figure is arranged inside the taken image 56 may be identified by a known image analysis technique, for example. Then, if a ratio of the area of the identified region to the area of the entire taken image 56 is higher than a predetermined value, the user wearing the HMD 12 may be determined to have looked down, upon which the HMD 12 is changed from the non-forced state to the forced state.

It is highly possible for the user wearing the HMD 12 to look down when the user wants to look around his or her hands. Hence, as described above, changing the HMD 12 from the non-forced state to the forced state upon detection that the user wearing the HMD 12 has moved his or her head down allows the user wearing HMD 12 to visually recognize around the hands by looking down.

Also, the HMD 12 may have a camera capable of tracing a line-of-sight direction of the user by a pupil detection function or the like. Then, when detection is done by a line-of-sight tracking technique that the line-of-sight of the user moves down, more than 45 degrees from the horizontal direction, for example, the HMD 12 may be changed from the non-forced state to the forced state. The arrangement allows the user to visually recognize in front of the display block 36 such as around the hands of the user by only moving down the line-of-sight without moving the head.

If the inclusion of an image of the controller 22 is detected in the taken image 56, then the HMD 12 may be changed from the non-forced state to the forced state, for example. If the controller 22 includes a light-emitting diode (LED) and an image of this LED is detected as included in the taken image 56, then the HMD 12 may be changed from the non-forced state to the forced state, for example. This arrangement allows the user to easily take up the controller 22 by looking at a place where the controller 22 is positioned.

If the inclusion of an image of the controller 22 is detected in the taken image 56, then the HMD 12 may be changed from the forced state to the non-forced state so as for the entertainment apparatus 14 to start the displaying of a menu or the execution of a game program. Further, if a predetermined time has passed since the detection of the inclusion of an image of the controller 22, the entertainment apparatus 14 may start the execution of a game program, for example. This arrangement starts the playing of a game without executing an explicit manipulation such as a start manipulation by the user when the user takes up the controller 22.

In addition, if the inclusion of an image of a portable terminal such as a smartphone is detected in the taken image 56, the HMD 12 may be changed from the non-forced state to the forced state, for example. If a predetermined image displayed on a portable terminal is detected as included in the taken image 56, the HMD 12 may be changed from the non-forced state to the forced state, for example. This arrangement allows the user wearing the HMD 12 to visually recognize this portable terminal by holding up, in the forward direction, the portable terminal displayed with a predetermined image.

Also, the HMD 12 may include a wireless interface that provides communication with a portable terminal such as a smartphone, for example. Upon detecting the occurrence of an event such as the termination to the smartphone, the HMD 12 may be changed from the non-forced state to the forced state, for example. This occurrence of an event can be detected by the reception of a signal transmitted from a smartphone, the acceptance of an audio signal issued from a smartphone, or the recognition of a light emitted from a smartphone, for example. This arrangement allows the user to smoothly manipulate a smartphone without detaching the HMD 12 at the time of the occurrence of an event such as the termination to the smartphone.

Further, in accordance with the detection of the disconnection of the HMD 12 from the entertainment apparatus 14, the HMD 12 may be changed from the non-forced state to the forced state. This arrangement prevents the occurrence of a situation in which the visual field of the user wearing the HMD 12 is suddenly darkened or an abnormal video image is displayed on the display block 36. The disconnection between the HMD 12 and the entertainment apparatus 14 is caused by a cable trouble, unplugging, a wireless connection trouble, a hang-up of the entertainment apparatus 14, a power supply trouble, or the like. It should be noted that, if the HMD 12 cannot be powered from the entertainment apparatus 14 or the relay apparatus 16, the HMD 12 may be powered from a built-in battery. In accordance with the detection of the connection of the HMD 12 with the entertainment apparatus 14, the HMD 12 may be changed from the forced-state to the non-forced state.

Also, the information processing apparatus 10 may be detectable of the tension or entanglement of a cable interconnecting the HMD 12 and the relay apparatus 16, a cable interconnecting the entertainment apparatus 14 and the relay apparatus 16, and a cable interconnecting the relay apparatus 16 and the display 18. Also, the information processing apparatus 10 may be detectable of the tension or entanglement of a cable interconnecting the entertainment apparatus 14 and the camera and microphone unit 20 and a cable interconnecting the entertainment apparatus 14 and the controller 22. Then, in accordance with the detection of the tension or entanglement, the HMD 12 may be changed from the non-forced state to the forced state. And, in accordance with the detection of the solution of the tension or entanglement of a cable, the HMD 12 may be changed from the forced state to the non-forced state.

It should be noted that the display control block 66 may control the entertainment apparatus 14 when the HMD 12 is changed from the non-forced state to the forced state such that a game being played is paused or the content such as a movie being reproduced is temporarily stopped. For example, in the above-mentioned processing depicted in S105, the display control block 66 may control the entertainment apparatus 14 such that a game being played is paused or the content such as a movie being reproduced is temporarily stopped. To be more specific, the display control block 66 may transmit a stop signal to the entertainment apparatus 14 and the entertainment apparatus 14 that has received the stopped signal may pause a game being played or temporarily stop a movie being reproduced, for example.

It is also practicable that, when the HMD 12 is changed from the forced state to the non-forced state, the display control block 66 may control the entertainment apparatus 14 such that the paused game is restarted or the temporarily stopped content such as a movie is reproduced. For example, in the above-mentioned processing depicted in S107, the display control block 66 may control the entertainment apparatus 14 such that the paused game is restarted or the temporarily stopped content such as a movie is reproduced.

The above-mentioned arrangement allows the prevention of the progression of a game or the reproduction of content regardless of the intention of the user when a video image generated by the entertainment apparatus 14 is not displayed in the forced state.

Further, the sensor block 40 may include sensors for measuring such vital signs as heart rate, respiratory rate, and perspiration. Then, in accordance with the measuring results of vital signs, the HMD 12 may be changed from the non-forced state to the forced state or from the forced state to the non-forced state. For example, if the heart rate is in excess of a predetermined level, the HMD 12 may be changed from the non-forced state to the forced state. This arrangement can present a video image of a real space to the user if some abnormality occurs in the body of the user, for example.

As described above with reference to some examples, the display control block 66 may determine whether or not to display the taken image 56 on the display block 36 on the basis of the taken image 56 taken by the camera block 42. This arrangement allows the user visually recognize a situation to be visually recognized that occurs in front of the user by properly setting conditions.

It should be noted that the present invention is not restricted to the embodiment described above.

It should also be noted that the above-mentioned character strings, numerals, and the specific character strings and numerals that are used in drawings are illustratively only and therefore not restricted thereto.

The invention claimed is:

1. A head-mounted display worn by a user, comprising:
a display block arranged in front of eyes of the user for displaying a first video image generated by an entertainment apparatus,
wherein the display block is non-transmissive;
a detection block configured to detect proximity between the user and an object around the user on the basis of one of an image and data generated by an apparatus separate from the head-mounted display;
a control block configured to have the user visually recognize a forward direction of the display block by controlling the display block in accordance with proximity detected by the detection block; and
a camera configured to take an image of a forward direction of the display block,
wherein the display block switches from displaying the first video image to a second video image of the object from the camera when the object is less than a first predetermined distance from the user,
wherein the display block resumes display of the first video image only when the object is greater than a second predetermined distance from the user,
wherein the second predetermined distance is greater than the first predetermined distance.

2. The head-mounted display according to claim 1, wherein
the detection block detects proximity between the user and the object on the basis of a distance between the user and the object that is identified on the basis of one of an image and data generated by the separate apparatus.

3. A display control method comprising:
displaying a game image to a user on a display of a head-mounted display,
wherein the game image is controlled by a user of the head-mounted display;
detecting proximity between the user and an object around the user on the basis of one of an image and data generated by an apparatus separate from the head-mounted display;
replacing the game image with an image of the object captured by a camera if the object is less than a first predetermined distance from the user; and
redisplaying the game image only when the object is greater than a second predetermined distance from the user,
wherein the second predetermined distance is greater than the first predetermined distance.

4. A non-transitory computer readable medium having stored thereon a program for a computer, the program comprising:
displaying a game image to a user on a display of a head-mounted display,
wherein the game image is controlled by a user of the head-mounted display;
detecting proximity between the user and an object around the user on the basis of one of an image and data generated by an apparatus separate from the head-mounted display; and
replacing the game image with an image of the object captured by a camera if the object is less than a first predetermined distance from the user; and
redisplaying the game image only when the object is greater than a second predetermined distance from the user,
wherein the second predetermined distance is greater than the first predetermined distance.

* * * * *